United States Patent [19]

Arpin

[11] 3,923,718

[45] Dec. 2, 1975

[54] STYRENE-BUTADIENE ADHESIVE COMPOSITION IN THE FORM OF AN AQUEOUS DISPERSION

[75] Inventor: Rene Arpin, Lyon, France

[73] Assignee: Rhone-Progil, Courbevoie, France

[22] Filed: Sept. 17, 1973

[21] Appl. No.: 398,094

[30] Foreign Application Priority Data

Sept. 21, 1972 France .............................. 72.33439

[52] U.S. Cl. .......... 260/29.7 UA; 229/53; 260/17 R; 260/17.4 BB; 260/29.7 WA
[51] Int. Cl.² .......................................... C08L 25/10
[58] Field of Search ............ 260/29.7 WA, 29.7 UA, 260/17 R, 17.4 BB

[56] References Cited
UNITED STATES PATENTS

| | | | |
|---|---|---|---|
| 2,883,351 | 4/1959 | Uraneck et al. | 260/17.5 |
| 2,961,799 | 11/1960 | Coe | 47/9 |
| 3,035,004 | 5/1962 | Glavis | 260/29.7 |
| 3,650,995 | 3/1972 | Erickson | 260/2.5 |

*Primary Examiner*—Lester L. Lee
*Attorney, Agent, or Firm*—McDougall, Hersh & Scott

[57] ABSTRACT

The invention is addressed to an adhesive composition in the form of an aqueous dispersion which, in the form of a thin film, can resist exposure to air over a period of time without losing its adhesiveness and which can be employed under high temperature conditions. The adhesive composition comprises a 20% to 85%, by weight, aqueous dispersion in which the dry solids is formulated of 90% to 10% by weight fine mineral particles and 10% to 90% by weight of a mixture of styrene and butadiene copolymer and a hydrosoluble water retainer.

5 Claims, No Drawings

STYRENE-BUTADIENE ADHESIVE COMPOSITION IN THE FORM OF AN AQUEOUS DISPERSION

This invention relates to an improvement in adhesive compositions adapted particularly for the preparation of undulated cardboard.

The adhesive composition of this invention is in the form of an aqueous dispersion containing 20 to 85% by weight dry solids which contain:

10 to 90% by weight of one or more synthetic polymer particles of from 0.05 to 10 microns, in which the polymers are selected from the group consisting of homopolymers of vinyl acetate or styrene; vinyl acetate, vinyl chloride or vinylidene copolymerized with at least one monomer containing at least one ethylenic double bond; and styrene copolymers with at least one monomer having 1 to 2 ethylenic double bonds; and 90 to 10% by weight mineral particles, ranging in dimension from 0.1 to 120 microns, and selected from the group consisting of calcium, magnesium, aluminum or barium in the form of their corresponding carbonates, sulphates and silicates.

The adhesive composition is especially appropriate for low temperature gluing of paper, such for example, in the preparation of undulated cardboard, whereby it becomes possible, by reason of the short setting time, to comply with the high production speeds of commercial practice.

However, in certain gluing operations, it is often necessary to enable exposure of the surfaces coated with the adhesive film to air for a period of time prior to contacting the surfaces to be adhered for interbonding. The improvement of this invention makes it possible to modify the adhesive composition in a manner to permit exposure of the composition, in the form of a thin film, for a sufficient time without losing its adhesiveness. The time during which an adhesive coating may remain exposed to air, at a given temperature, without losing its capacity to adhere, is designated by the expression "open time".

The adhesive composition embodying the features of this invention is in the form of an aqueous dispersion of 20 to 85% by weight dry solids, in which the dry solids are formulated of 90 to 10% by weight mineral particles, having a particle size within the range of 0.1 to 120 microns and selected from the group consisting of calcium, magnesium and barium, in the form of their carbonates or sulphates, and from 10 to 90% by weight of a mixture of styrene and butadiene copolymer in the form of particles ranging in dimension from 0.05 to 10 microns and at least one hydrosoluble water retainer.

In defining the retainers as "hydrosoluble", it will be understood that they can be placed both in pseudo solutions and in real solutions. Such retainers are selected from the group comprising derivatives of polyacrylic acid, preferably alkaline metal acrylates; hydroxy alcoyl cellulose derivatives, preferably hydroxy ethyl cellulose, hydroxy propyl cellulose, hydroxy methyl cellulose, carboxy methyl ethyl cellulose, polyvinyl alcohol and alginates. The term alginates includes alkaline metal salts of alginic acid (d-mannuroic anhydro-beta acid polymer). The ratio, by weight, of water retainer in admixture with the styrene-butadiene copolymer may vary quite broadly, depending upon the nature of the retainer, such as within the range of 1:15 to 10:15. If use is made of alkaline metal polyacrylate, the preferred ratio would be within the range of 1:10 to 2:10.

As the styrene-butadiene copolymer, it is preferred to make use of a copolymer in which the styrene is present in the amount of 40 to 75% by weight.

The mineral particles may be natural minerals such as oolithic limestone, dolomite, barytime, crushed or analogous chemically prepared compounds. It is preferred that at least 50% of the mineral particles be dimensioned within the range of 0.05 to 20 microns. Other minerals, such as silica, may be introduced in small amounts (less than 10% by weight of the total mineral content).

The composition advantageously has a viscosity corresponding to a flow time of 30 to 50 seconds at 20°C. as measured by Section 6 under the method of AFNOR N.F.T. standard 30,014.

The composition is prepared simply by mixing, with agitation, the successive introduction into an appropriate container, the dispersion of the polymer, the supplementary water, the mineral particles, and finally the retaining agent, previously placed in solution. When use is made of polyvinyl alcohol, it is introduced preferable prior to the mineral particles.

The gluing itself is carried out at ambient temperature or at a slightly elevated temperature. At ambient temperature, the open time may exceed 1 minute.

The composition of this invention can be used for gluing various papers, particularly in the production of undulated cardboard, and other materials such as wood or leather. The composition is particularly useful when several operations are to be carried out or when a waiting time is imposed between the application of the glue and combining of the surfaces to be adhered. This is the case particularly in the preparation of paper bags of large dimension. The small amount of water that is used does not cause deterioration of the cellulose sheets during storage, as with conventional glues. Another advantage, offered by the invention, manifests itself in particular, when such bags are to be filled at relatively high temperature, such as in cement plants where the product delivered from the heating drums is poured into bags at temperatures of the order of 100°C. In such instances, the film withstands the temperatures very effectively. Moreover, as a result of the slightly basic pH of the dispersion, the adhesive does not cause corrosion of the equipment or containers.

An example is hereinafter given by way of illustration, but not by way of limitation of the use of a composition embodying the features of this invention, to show its characteristics, the ingredients being given in percent or parts by weight.

EXAMPLE

The adhesive compositions A and B, employed in the tests are aqueous dispersions of: 250 and 240 parts by weight of a 50% dispersion in water of styrene-butadiene copolymer (60% styrene) in the form of particles having an average particle size ranging from 0.1 to 2 microns; 444 and 412 parts by weight of crushed oolythic carbonate having an average particle size ranging from 1 to 40 microns, with 50% of the particles having a particle size within the range of 1 to 3 microns; 88 and 114 parts by weight of a 15% solution in water of sodium polyacrylate, marketed by Rhone-Progil of Paris, France under the designation "ER-ZA 0.10"; the necessary amount of water (216 and 234 parts by weight) to bring the percentage by weight of dry solids to 58 and 53% by weight, respectively.

The measured viscosities respectively correspond with flow times of 40 and 33 seconds for the compositions A and B.

The ingredients were combined in the manner previously described in the specification.

Tests were carried out with the adhesive compositions, using a channel paper (for undulated cardboard) with a large proportion of semi-chemical paste, weighing 125 grams per square meter and with craft paper (called cover paper for corrugated cardboard) weighing 150 grams per square meter. The papers were preconditioned for 48 hours in a room maintained at 23 (± 1)°C. and 50 (± 1)% relative humidity.

The adhesive composition is spread as a film having a thickness of 0.05 mm and a width of 20 mm on a piece of channel paper 100 × 40 mm, in the direction of the width and perpendicular to the direction of the paper fiber.

Setting Time Test 0.5 seconds after spreading the composition, a piece of cover paper 20 × 80 mm is applied with the pressure of 50 gams/cm² with the rough side of the paper pressed into contact with the glue film and with its fibers parallel with those of the channel paper. The gluing surface (20 × 20 mm) is thus 40 cm². The setting time, which is the minimum time after which the assembly carried out as described above resists a pulling force of 25 grams/cm², exerted perpendicular to the plane of the glue, is 15 seconds for composition A and 25 seconds for composition B. The papers are pressed against each other until pressure is replaced by the pulling test force.

Flow Test

For this test, the papers are cut and pressed against each other as in the previous test. Pressure of 50 grams/cm² is maintained for 30 seconds. The test pieces are then placed in the aforementioned conditioned room for the same amount of time, then suspended in vertical position by a channel paper in a ventilated oven maintained at a temperature of 120°C. A weight of 500 grams is attached to the cover paper to apply a 500 gram force for separation. No ungluing is observed at the level of the glue plane.

Open Time Test

The initial operation, for this test, is the same as in the test for the setting time, but variable periods of time are allowed to elapse prior to the application of the cover paper on to the channel paper and the time of exposure in air of the glue layer is determined for which the same pulling force is resisted by the adhesiveness. It has been observed that this open time is 30 seconds for composition A and 110 seconds for composition B.

It will be understood that changes may be made in the details of formulation and operation, without departing from the spirit of the invention, especially as defined in the following claims.

I claim:

1. An adhesive composition in the form of a 20–85% by weight aqueous dispersion containing, on the solids basis, 90–10% by weight mineral particles having a dimension within the range of 0.1–120 microns and selected from the group consisting of calcium, magnesium and barium sulphates and carbonates, 10–90% by weight of a mixture of styrene and butadiene copolymer in the form of particles dimensioned within the range of 0.05–10 microns and of at least one hydrosoluble water retainer selected from the group consisting of alkaline metal polyacrylates, hydroxy alkyl cellulose, carboxymethyl ethyl cellulose, polyvinyl alcohol and an alginate, in which the hydrosoluble water retainer is present in the ratio of 1–10 parts by weight of the hydrosoluble water retainer to 15 parts by weight of the copolymer.

2. An adhesive composition as claimed in claim 1 in which the hydrosoluble retainer is an alkaline metal polyacrylate.

3. An adhesive composition as claimed in claim 1 in which the hydrosoluble water retainer is a hydroxy alkyl cellulose selected from the group consisting of hydroxy ethyl cellulose, hydroxy propyl cellulose, and hydroxy methyl ethyl cellulose.

4. An adhesive composition as claimed in claim 2 in which the alkaline metal polyacrylate to the styrene-butadiene copolymer is in the weight ratio within the range of 1:10–2:10.

5. An adhesive composition as claimed in claim 1 in which the amount of styrene in the styrene-butadiene copolymer is within the range of 40–75%.

* * * * *